US012797957B2

(12) United States Patent
Shirochi

(10) Patent No.: US 12,797,957 B2
(45) Date of Patent: Nov. 17, 2026

(54) COATED CUTTING TOOL

(71) Applicant: TUNGALOY CORPORATION, Fukushima (JP)

(72) Inventor: Tsukasa Shirochi, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 475 days.

(21) Appl. No.: 18/531,083

(22) Filed: Dec. 6, 2023

(65) Prior Publication Data

US 2024/0189919 A1 Jun. 13, 2024

(30) Foreign Application Priority Data

Dec. 7, 2022 (JP) ................................. 2022-195751

(51) Int. Cl.
*B23B 27/14* (2006.01)
*C23C 28/00* (2006.01)

(52) U.S. Cl.
CPC ............ *B23B 27/14* (2013.01); *C23C 28/347* (2013.01); *B23B 2224/04* (2013.01); *B23B 2224/32* (2013.01); *B23B 2228/105* (2013.01); *B23B 2228/36* (2013.01)

(58) Field of Classification Search
None
See application file for complete search history.

(56) References Cited

U.S. PATENT DOCUMENTS 5,915,162 A 6/1999 Uchino et al.
2014/0227547 A1* 8/2014 Ri .......................... C23C 16/36 428/565
2017/0275765 A1 9/2017 Stiens et al.
2022/0134445 A1* 5/2022 Ri ....................... B23B 27/1611 407/30
2024/0351113 A1* 10/2024 Manns .................... C23C 28/40

FOREIGN PATENT DOCUMENTS

| | | | |
|---|---|---|---|
| EP | 1207216 | A1 | 5/2002 |
| EP | 3 000 913 | A1 | 3/2016 |
| WO | 94/28191 | A1 | 12/1994 |
| WO | 00/079022 | A1 | 12/2000 |

OTHER PUBLICATIONS

H. Chien et al., "The influence of residual thermal stresses on the mechanical properties of multilayer α-Al2O3/TiCxN1—x coatings on WC/Co cutting tools", Surface and Coatings Technology, vol. 215, Nov. 6, 2012, pp. 119-126.

* cited by examiner

*Primary Examiner* — Xiaobei Wang
(74) *Attorney, Agent, or Firm* — Studebaker Brackett PLLC

(57) ABSTRACT

A coated cutting tool comprising a substrate and a coating layer formed on a surface of the substrate, wherein the coating layer comprises a lower layer, an intermediate layer, and an upper layer in this order from the substrate side to the surface side of the coating layer, the lower layer comprises one or two or more specific Ti compound layers, the intermediate layer comprises an α-$Al_2O_3$ layer, the upper layer comprises one or two or more specific Ti compound layers, at least one of the Ti compound layers in the upper layer is a TiCN layer, the average thickness of the upper layer is 1.00 μm or more and 6.50 μm or less, and the upper layer satisfies the conditions represented by the formula (i): $25 \leq RSA1 < 70$ and the formula (ii): $25 \leq RSA2 < 70$.

20 Claims, 1 Drawing Sheet

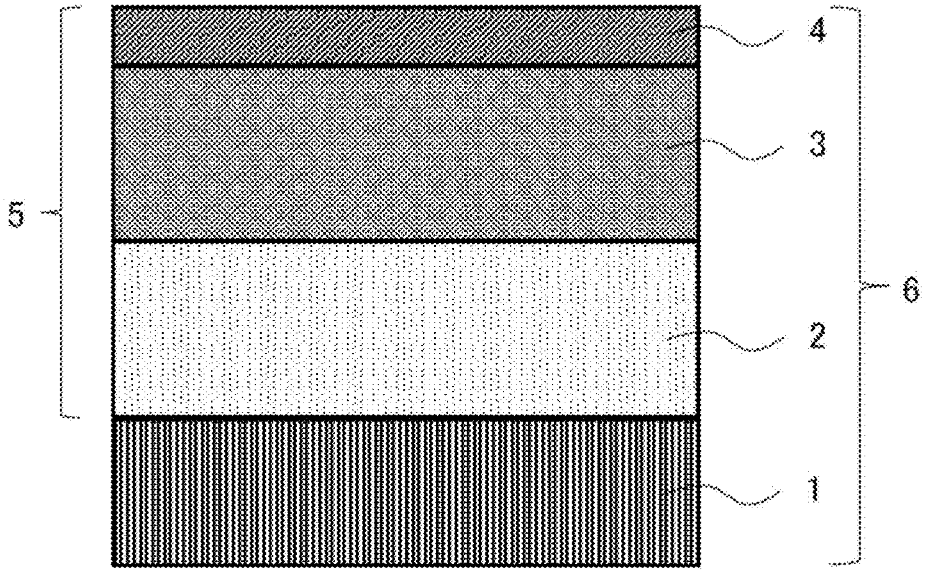
4
3
5
6
2
1

COATED CUTTING TOOL

TECHNICAL FIELD

The present invention relates to a coated cutting tool.

BACKGROUND ART

It is well known that a conventional coated cutting tool used for the cutting of steel, cast iron, etc., is a coated cutting tool which is obtained by depositing, via chemical vapor deposition, a coating layer with a total thickness of from 3 μm or more to 20 μm or less on a surface of a substrate consisting of a cemented carbide. A known example of the above coating layer is a coating layer consisting of a single layer of one kind selected from the group consisting of a Ti carbide, a Ti nitride, a Ti carbonitride, a Ti carboxide, a Ti oxycarbonitride, and aluminum oxide ($Al_2O_3$), or consisting of multiple layers of two or more kinds selected therefrom.

WO 2000/079022 A describes a coated hard alloy including a coating layer on a hard alloy surface, wherein the coating layer includes an inner layer, an intermediate layer, and an outer layer in an order from a hard alloy side; the inner layer includes one or more layers selected from carbides, nitrides, borides, and oxides of IVa, Va, and VIa groups in a periodic table, and solid solutions thereof; the intermediate layer includes one or more layers selected from aluminum oxide, zirconium oxide, and solid solutions thereof; the outer layer includes one or more layers selected from carbides, nitrides, borides, and oxides of IVa, Va, and VIa groups in a periodic table, and solid solutions thereof, and aluminum oxide, the one or more layers including a titanium carbonitride layer having a columnar structure; and a relationship between a maximum roughness Amax of a surface layer part of the intermediate layer in a cross-sectional structure of the coated hard alloy and a maximum roughness Bmax of a surface layer part of the titanium carbonitride layer having a columnar structure in the outer layer satisfies a formula 1:

$$(B\max/A\max)<1 \quad \text{Formula 1}$$

provided that 0.5 μm<Amax<4.5 μm, and 0.5 μm≤Bmax≤4.5 μm.

WO 2000/079022 A also describes that the orientation index TC shown in the formula 3 of the titanium carbonitride layer having a columnar structure in the outer layer is the largest in any of a (220) plane, a (311) plane, a (331) plane, and a (422) plane, and the maximum value thereof is 1.3 or more and 3.5 or less:

$$TC(hkl) = \frac{I(hkl)}{Io(hkl)}\left\{\frac{1}{8}\sum_{x,y,z}\frac{I(h_xk_yl_z)}{Io(h_xk_yl_z)}\right\}^{-1} \quad \text{Formula 3}$$

wherein $I(hkl)$ and $I(h_xk_yl_z)$ are diffraction intensities of measured (hkl) or $(h_xk_yl_z)$ planes, Io(hkl) and $Io(h_xk_yl_z)$ are average values of powder diffraction intensities of TiC and TiN on (hkl) or $(h_xk_yl_z)$ planes by ASTM Standard, and (hkl) and $(h_xk_yl_z)$ are 8 planes of (111), (200), (220), (311), (331), (420), (422), and (511).

SUMMARY

Technical Problem

An increase in speed, feed and depth of cut has become more conspicuous in cutting in recent times, and the chipping resistance of a tool and the wear resistance thereof are required to be further improved compared to those involved in the prior art. In particular, in recent years, there has been an increase in the number of cutting operations in which a load is applied to a coated cutting tool, such as high-speed cutting of steel, and under such severe cutting conditions, chipping resistance and wear resistance are not sufficient in the conventional tools, which makes it impossible to extend the tool life. While the coated hard alloy described in WO 2000/079022 A is excellent in the adhesion between the intermediate layer and the outer layer, the wear resistance is insufficient, and thus there is room for improvement.

The present invention has been made in light of the above circumstances, and an object of the present invention is to provide a coated cutting tool which has excellent chipping resistance and wear resistance and which accordingly allows for an extended tool life.

Solution to Problem

The inventor of the present invention has conducted research on extending the tool life of a coated cutting tool from the above perspective. It has been found that, with a specific configuration, the chipping resistance and the wear resistance can be improved, and as a result, the tool life can be extended. The present invention has been accomplished based on this finding.

Thus, the present invention is as follows.

[1] A coated cutting tool comprising a substrate and a coating layer formed on a surface of the substrate, wherein:

the coating layer comprises a lower layer, an intermediate layer, and an upper layer in this order from the substrate side to the surface side of the coating layer;

the lower layer comprises one or two or more Ti compound layers containing a Ti compound of Ti and an element of at least one kind selected from the group consisting of C, N, O and B;

the intermediate layer comprises an $\alpha$-$Al_2O_3$ layer containing $\alpha$-$Al_2O_3$, the upper layer comprises one or two or more Ti compound layers containing a Ti compound of Ti and an element of at least one kind selected from the group consisting of C, N and O, and at least one of the Ti compound layers in the upper layer is a TiCN layer;

an average thickness of the upper layer is 1.00 μm or more and 6.50 μm or less; and the upper layer satisfies conditions represented by following formula (i) and formula (ii):

$$25 \le RSA1 < 70 \quad \text{(i)}$$

in the formula (i), where, in a cross section of the upper layer in a direction perpendicular to the surface of the substrate, a sum of areas of an entire cross section is taken as 100 area %, RSA1 is a ratio (unit: area %) of a cross-sectional area of a region where a misorientation A is 0 degrees or more and less than 10 degrees, the misorientation A being an angle (unit: degree) formed by a normal to a (220) plane of each grain having a cubic crystalline structure and a normal to the surface of the substrate; and $$25 \le RSA2 < 70 \quad \text{(ii)}$$

in the formula (ii), where, in a cross section of the upper layer in a direction perpendicular to the surface of the substrate, a sum of areas of an entire cross section is taken as 100 area %, RSA2 is a ratio (unit: area %) of a cross-sectional area of a region where a misorientation A is 20 degrees or more and less than 30 degrees, the misorientation A being an angle (unit: degree) formed by a normal to a (220) plane of each grain having a cubic crystalline structure and a normal to the surface of the substrate.

[2] The coated cutting tool according to [1], wherein a sum of the RSA1 and RSA2 is 60 area % or more and 90 area % or less in the upper layer.

[3] The coated cutting tool according to [1] or [2], wherein the upper layer is in contact with the intermediate layer; the upper layer comprises at least one layer selected from the group consisting of a layer containing TICO, a layer containing TiON, and a layer containing TICNO as an adhesion layer on a side in contact with the intermediate layer; and an average thickness of the adhesion layer is 0.05 μm or more and 1.50 μm or less.

[4] The coated cutting tool according to any one of [1] to [3], wherein a texture coefficient TC(0,0,12) of a (0,0,12) plane of the $\alpha$-$Al_2O_3$ layer represented by a following expression (1):

$$TC(0,0,12) = \frac{I(0,0,12)}{I_0(0,0,12)}\left\{\frac{1}{9}\sum\frac{I(h,k,l)}{I_0(h,k,l)}\right\}^{-1} \quad (1)$$

wherein I(h,k,l) is a peak intensity by X-ray diffraction obtained by measuring a (h,k,l) plane of the $\alpha$-$Al_2O_3$ layer, $I_0$(h,k,l) is a standard diffraction intensity of a (h,k,l) plane of $\alpha$-$Al_2O_3$ obtained from JCPDS card number 10-0173, and (h,k,l) refers to 9 crystal planes of (0,1,2), (1,0,4), (1,1,3), (0,2,4), (1,1,6), (2,1,4), (3,0,0), (0,2,10), and (0,0,12), is 5.9 or more and 8.9 or less in the intermediate layer.

[5] The coated cutting tool according to any one of [1] to [4], wherein an average thickness of the intermediate layer is 3.00 μm or more and 15.00 μm or less.

[6] The coated cutting tool according to any one of [1] to [5], wherein an average thickness of the lower layer is 3.00 μm or more and 15.00 μm or less.

[7] The coated cutting tool according to any one of [1] to [6], wherein an average thickness of the entire coating layer is 10.00 μm or more and 30.00 μm or less.

Advantageous Effects of Invention

The coated cutting tool of the present invention can extend the tool life by having excellent chipping resistance and wear resistance.

BRIEF DESCRIPTION OF DRAWINGS

The FIGURE is a schematic cross-sectional view showing an example of a coated cutting tool according to the present invention.

DESCRIPTION OF EMBODIMENTS

An embodiment for carrying out the present invention (hereinafter simply referred to as the "present embodiment") will hereinafter be described in detail, with reference to the attached drawings as appropriate. However, the present invention is not limited to the present embodiment below. Various modifications may be made to the present invention without departing from the gist of the invention. In the drawings, unless otherwise specified, positional relationships, such as vertical and horizontal relationships, are based on the positional relationships shown in the drawings. Further, the dimensional ratios of the drawings are not limited to those shown therein.

The coated cutting tool of the present embodiment is a coated cutting tool including a substrate and a coating layer formed on a surface of the substrate. The coating layer includes a lower layer, an intermediate layer, and an upper layer in this order from the substrate side to the surface side of the coating layer. The lower layer includes one or two or more Ti compound layers containing a Ti compound of Ti and an element of at least one kind selected from the group consisting of C, N, O and B. The intermediate layer includes an $\alpha$-$Al_2O_3$ layer containing $\alpha$-$Al_2O_3$. The upper layer includes one or two or more Ti compound layers containing a Ti compound of Ti and an element of at least one kind selected from the group consisting of C, N and O, and at least one of the Ti compound layers in the upper layer is a TiCN layer. An average thickness of the upper layer is 1.00 μm or more and 6.50 μm or less. The upper layer satisfies conditions represented by following formulas (i) and formula (ii):

$$25 \le RSA1 < 70 \quad (i)$$

in the formula (i), where, in a cross section of the upper layer in a direction perpendicular to the surface of the substrate, a sum of areas of an entire cross section is taken as 100 area %, RSA1 is a ratio (unit: area %) of a cross-sectional area of a region where a misorientation A is 0 degrees or more and less than 10 degrees, the misorientation A being an angle (unit: degree) formed by a normal to a (220) plane of each grain having a cubic crystalline structure and a normal to the surface of the substrate; and $$25 \le RSA2 < 70 \quad (ii)$$

in the formula (ii), where, in a cross section of the upper layer in a direction perpendicular to the surface of the substrate, a sum of areas of an entire cross section is taken as 100 area %, RSA2 is a ratio (unit: area %) of a cross-sectional area of a region where a misorientation A is 20 degrees or more and less than 30 degrees, the misorientation A being an angle (unit: degree) formed by a normal to a (220) plane of each grain having a cubic crystalline structure and a normal to the surface of the substrate.

The coated cutting tool of the present embodiment comprises the above-described configurations, and this allows the chipping resistance and the wear resistance of the coated cutting tool to be improved; as a result, the tool life thereof can be extended. The factors for the improvements in chipping resistance and wear resistance of the coated cutting tool of the present embodiment can be considered to be set forth as follows. However, the present invention is not in any way limited by the factors set forth below. In other words, firstly, in the coated cutting tool of the present embodiment, since the average thickness of the upper layer is 1.00 μm or more, the wear resistance is improved. Meanwhile, in the coated cutting tool of the present embodiment, since the average thickness of the upper layer is 6.50 μm or less, the adhesion between the upper layer and the intermediate layer is improved and the chipping resistance is excellent. In the coated cutting tool of the present embodiment, since the RSA1 is 25 area % or more, the adhesion between the upper layer and the intermediate layer is excellent and the chipping resistance is excellent. Meanwhile, in the coated cutting tool of the present embodiment, since the RSA1 is less than 70 area %, the wear resistance is excellent. In the coated cutting tool of the present embodiment, since the RSA2 is 25 area % or more, the wear resistance is excellent. Meanwhile, in the coated cutting tool of the present embodiment, since the RSA2 is less than 70 area %, production is easy. The combining of the above configurations allows for the coated cutting tool of the present embodiment to have improved chipping resistance and wear resistance, and accordingly, it can be considered that the tool life can be extended.

The FIGURE is a schematic cross-sectional view showing an example of the coated cutting tool of the present embodiment. A coated cutting tool 6 is provided with a substrate 1 and a coating layer 5 located on a surface of the substrate 1, and a lower layer 2, an intermediate layer 3 and an upper layer 4 are laminated in this order from the substrate side in an upward direction in the coating layer 5.

The coated cutting tool according to the present embodiment comprises a substrate and a coating layer formed on a surface of the substrate. Specific examples of types of the coated cutting tool include an indexable cutting insert for milling or turning, a drill and an end mill.

The substrate used in the present embodiment is not particularly limited, as long as it may be used as a substrate for a coated cutting tool. Examples of such substrate include a cemented carbide, cermet, ceramic, a cubic boron nitride sintered body, a diamond sintered body and high-speed steel. From among the above examples, the substrate is preferably comprised of a cemented carbide, cermet, ceramic or a cubic boron nitride sintered body as this provides further excellent wear resistance and fracture resistance, and, from the same perspective, the substrate is more preferably comprised of a cemented carbide.

It should be noted that the surface of the substrate may be modified. For instance, when the substrate is comprised of a cemented carbide, a β-free layer may be formed on the surface thereof, and when the substrate is comprised of cermet, a hardened layer may be formed on the surface thereof. The operation and effects of the present invention are still provided even if the substrate surface has been modified in this way.

The average thickness of the entire coating layer used in the present embodiment is preferably 10.00 μm or more and 30.00 μm or less. In the coated cutting tool of the present embodiment, where the average thickness of the entire coating layer is 10.00 μm or more, the wear resistance tends to be improved, and where the average thickness of the entire coating layer is 30.00 μm or less, the chipping resistance and the fracture resistance tend to be excellent. From the same viewpoint, the average thickness of the entire coating layer is preferably 13.50 μm or more and 26.45 μm or less, and still more preferably 14.70 μm or more and 25.05 μm or less.

It should be noted that, as to the average thickness of each layer and the average thickness of the entire coating layer in the coated cutting tool of the present embodiment, each of such average thicknesses can be obtained by: measuring the thickness of each layer or the thickness of the entire coating layer from each of the cross-sectional surfaces at three or more locations in each layer or in the entire coating layer; and then calculating the arithmetic mean of the resulting measurements.

Lower Layer

The lower layer used in the present embodiment includes one or two or more Ti compound layers composed of a Ti compound of Ti and an element of at least one kind selected from the group consisting of C, N, O and B. When the coated cutting tool includes the lower layer between the substrate and the intermediate layer including the α-$Al_2O_3$ layer, the wear resistance and adhesion are improved.

The Ti compound layer in the lower layer is not particularly limited, and examples thereof include a TiC layer containing TiC, a TiN layer containing TIN, a TiCN layer containing TiCN, a TiCO layer containing TICO, a TiCNO layer containing TiCNO, a TiON layer containing TION, and a $TiB_2$ layer containing $TiB_2$.

The lower layer may be constituted by a single layer or multiple layers (for example, two or three layers). However, the lower layer is preferably constituted by multiple layers, is more preferably constituted by two or three layers, and is further preferably constituted by three layers. From the perspective of further improving the wear resistance and adhesion, the Ti compound constituting the Ti compound layer included in the lower layer is preferably at least one selected from the group consisting of TIN, TiC, TiCN, TICNO, TION and $TiB_2$. In addition, in the coated cutting tool of the present embodiment, it is preferable that at least one of the lower layer be a TiCN layer because the wear resistance is further improved. When the lower layer is constituted by three layers: a TiC layer or a TiN layer, serving as a first layer, may be formed on a surface of the substrate; a TiCN layer, serving as a second layer, may be formed on a surface of the first layer; and a TiCNO layer or a TiCO layer, serving as a third layer, may be formed on a surface of the second layer. In particular, as to the lower layer: a TiN layer, serving as a first layer, may be formed on a surface of the substrate; a TiCN layer, serving as a second layer, may be formed on a surface of the first layer; and a TiCNO layer, serving as a third layer, may be formed on a surface of the second layer.

The average thickness of the lower layer used in the present embodiment is preferably 3.00 μm or more and 15.00 μm or less. The coated cutting tool of the present embodiment tends to have improved wear resistance because the average thickness of the lower layer is 3.00 μm or more. Meanwhile, in the coated cutting tool of the present embodiment, since the average thickness of the lower layer is 15.00 μm or less, the chipping resistance and the fracture resistance tend to be improved. From the same viewpoint, the average thickness of the lower layer is more preferably 3.50 μm or more and 12.50 μm or less, and still more preferably 4.50 μm or more and 10.30 μm or less.

From the viewpoint of further improving the wear resistance and fracture resistance, the average thickness of the TiC layer or TiN layer in the lower layer is preferably 0.05 μm or more and 2.00 μm or less. From the same viewpoint, the average thickness of the TiC layer or TiN layer in the lower layer is more preferably 0.10 μm or more and 1.80 μm or less, and even more preferably 0.20 μm or more and 1.50 μm or less.

From the viewpoint of further improving the wear resistance and fracture resistance, the average thickness of the TiCN layer in the lower layer is preferably 2.00 μm or more and 15.00 μm or less. From the same viewpoint, the average thickness of the TiCN layer in the lower layer is more preferably 2.50 μm or more and 14.50 μm or less, and even more preferably 3.00 μm or more and 12.00 μm or less.

From the viewpoint of further improving wear resistance and fracture resistance, the average thickness of the TiCNO layer or TICO layer in the lower layer is preferably 0.10 μm or more and 1.00 μm or less. From the same viewpoint, the average thickness of the TICNO layer or the TICO layer in the lower layer is more preferably 0.20 μm or more and 0.50 μm or less.

The Ti compound layer in the lower layer is composed of a Ti compound of Ti and an element of at least one kind selected from the group consisting of C, N, O and B. However, such Ti compound layer may contain a very small amount of components other than the above elements, as long as it provides the operation and effects of the lower layer.

Intermediate Layer

The intermediate layer used in the present embodiment includes an $\alpha$-$Al_2O_3$ layer containing $\alpha$-$Al_2O_3$.

The average thickness of the intermediate layer used in the present embodiment is preferably 3.00 μm or more and 15.00 μm or less. Where the average thickness of the intermediate layer is 3.00 μm or more, the wear resistance tends to be improved and the control of TC(0,0,12) described below is easy. In addition, where the average thickness of the intermediate layer is 15.00 μm or less, the adhesion between the upper layer and the intermediate layer tends to be excellent and the chipping resistance tends to be excellent. From the same viewpoint, the average thickness of the intermediate layer is more preferably 3.20 μm or more and 14.60 μm or less, and still more preferably 4.00 μm or more and 13.00 μm or less.

In the coated cutting tool of the present embodiment, the texture coefficient TC(0,0,12) of a (0,0,12) plane of the $\alpha$-$Al_2O_3$ layer represented by the following expression (1):

$$TC(0,0,12) = \frac{I(0,0,12)}{I_0(0,0,12)}\left\{\frac{1}{9}\sum\frac{I(h,k,l)}{I_0(h,k,l)}\right\}^{-1} \quad (1)$$

wherein I(h,k,l) is a peak intensity by X-ray diffraction obtained by measuring a (h,k,l) plane of the $\alpha$-$Al_2O_3$ layer, $I_0$(h,k,l) is a standard diffraction intensity of the (h,k,l) plane of $\alpha$-$Al_2O_3$ obtained from JCPDS card number 10-0173, and (h,k,l) refers to 9 crystal planes of (0,1,2), (1,0,4), (1,1,3), (0,2,4), (1,1,6), (2,1,4), (3,0,0), (0,2,10), and (0,0,12), in the intermediate layer is preferably 5.9 or more and 8.9 or less.

Since the texture coefficient TC(0,0,12) of the (0,0,12) plane of the $\alpha$-$Al_2O_3$ layer represented by the above formula (1) is 5.9 or more in the intermediate layer, the coated cutting tool of the present embodiment tends to have excellent wear resistance and can increase the value of RSA2. Meanwhile, where the texture coefficient TC(0,0,12) of the (0,0,12) plane of the $\alpha$-$Al_2O_3$ layer represented by the above formula (1) is 8.9 or less in the intermediate layer, the coated cutting tool of the present embodiment can be easily produced. From the same viewpoint, the texture coefficient TC(0,0,12) of the (0,0,12) plane of the $\alpha$-$Al_2O_3$ layer represented by the above formula (1) is more preferably 6.3 or more and 8.9 or less, and still more preferably 7.0 or more and 8.9 or less.

It should be noted that, in the present embodiment, the texture coefficient TC(0,0,12) of the (0,0,12) plane of the $\alpha$-$Al_2O_3$ layer can be determined by the method described in Examples described below.

The intermediate layer only needs to have a layer containing $\alpha$-aluminum oxide ($\alpha$-$Al_2O_3$), and may or may not contain components other than $\alpha$-aluminum oxide ($\alpha$-$Al_2O_3$) as long as it provides the operation and effects of the present invention.

Upper Layer

The upper layer used in the present embodiment includes one or two or more Ti compound layers containing a Ti compound of Ti and an element of at least one kind selected from the group consisting of C, N and O, and at least one of the Ti compound layers in the upper layer is a TiCN layer. In addition, the upper layer used in the present embodiment satisfies the conditions represented by the following formula (i) and formula (ii):

$$25 \leq RSA1 < 70 \quad (i)$$

in the formula (i), where, in a cross section of the upper layer in a direction perpendicular to the surface of the substrate, a sum of areas of an entire cross section is taken as 100 area %, RSA1 is a ratio (unit: area %) of a cross-sectional area of a region where a misorientation A is 0 degrees or more and less than 10 degrees, the misorientation A being an angle (unit: degree) formed by a normal to a (220) plane of each grain having a cubic crystalline structure and a normal to the surface of the substrate; and $$25 \leq RSA2 < 70 \quad (ii)$$

in the formula (ii), where, in a cross section of the upper layer in a direction perpendicular to the surface of the substrate, a sum of areas of an entire cross section is taken as 100 area %, RSA2 is a ratio (unit: area %) of a cross-sectional area of a region where a misorientation A is 20 degrees or more and less than 30 degrees, the misorientation A being an angle (unit: degree) formed by a normal to a (220) plane of each grain having a cubic crystalline structure and a normal to the surface of the substrate.

In the coated cutting tool of the present embodiment, since the RSA1 is 25 area % or more, the adhesion between the upper layer and the intermediate layer is excellent and the chipping resistance is excellent. Meanwhile, in the coated cutting tool of the present embodiment, since the RSA1 is less than 70 area %, the wear resistance is excellent. From the same viewpoint, RSA1 is more preferably 27 area % or more and 61 area % or less, and still more preferably 30 area % or more and 48 area % or less. In the coated cutting tool of the present embodiment, since the RSA2 is 25 area % or more, the wear resistance is excellent. Meanwhile, in the coated cutting tool of the present embodiment, since the RSA2 is less than 70 area %, production is easy. From the same viewpoint, RSA2 is more preferably 26 area % or more and 65 area % or less, and still more preferably 28 area % or more and 53 area % or less.

In the coated cutting tool of the present embodiment, the sum of the RSA1 and the RSA2 in the upper layer is preferably 60 area % or more and 90 area % or less. In the coated cutting tool of the present embodiment, where the sum of the RSA1 and the RSA2 is 60 area % or more in the upper layer, the chipping resistance and the wear resistance tend to be excellent. Meanwhile, in the coated cutting tool of the present embodiment, where the sum of the RSA1 and the RSA2 is 90 area % or less in the upper layer, production is easy. From the same viewpoint, the sum of the RSA1 and the RSA2 is more preferably 62 area % or more and 90 area % or less, and still more preferably 64 area % or more and 90 area % or less.

It should be noted that, in the present embodiment, the RSA1 and the RSA2 can be determined by the method described in Examples described below.

The upper layer used in the present embodiment includes one or two or more Ti compound layers containing a Ti compound of Ti and an element of at least one kind selected from the group consisting of C, N and O.

At least one of the Ti compound layers in the upper layer is a TiCN layer containing TiCN. In addition, it is preferable that at least one of the Ti compound layers in the upper layer be a TiCN layer because the wear resistance is improved. Other Ti compound layers in the upper layer are not particularly limited, and examples thereof include a TiC layer containing TiC, a TiN layer containing TiN, a TiCO layer containing TICO, a TiCNO layer containing TICNO, and a TiON layer containing TION.

The upper layer may be constituted by a single layer or multiple layers (for example, two or three layers). When the upper layer is constituted by multiple layers, it is preferable to form the adhesion layer described below as a layer on a side in contact with the intermediate layer, and another layer may be formed on the surface of the TiCN layer opposite to the substrate. When the upper layer is constituted by two layers, a TiCN layer may be formed as a first layer, and a TiN layer may be formed on a surface of the first layer as a second layer. When the upper layer is constituted by three layers, a TiCNO layer or a TiCO layer, serving as an adhesion layer, may be formed on the side in contact with the intermediate layer; a TiCN layer, serving as a second layer, may be formed on the surface of the adhesion layer; and a TiN layer, serving as a third layer, may be formed on the surface of the second layer.

The average thickness of the upper layer used in the present embodiment is 1.00 μm or more and 6.50 μm or less. The coated cutting tool of the present embodiment has improved wear resistance because the average thickness of the upper layer is 1.00 μm or more. Meanwhile, in the coated cutting tool of the present embodiment, since the average thickness of the upper layer is 6.50 μm or less, the adhesion between the upper layer and the intermediate layer is improved and the chipping resistance is excellent. From the same viewpoint, the average thickness of the upper layer is preferably 1.20 μm or more and 5.00 μm or less, and more preferably 1.55 μm or more and 4.80 μm or less.

The average thickness of the TiCN layer in the upper layer is preferably 1.00 μm or more and 6.50 μm or less. The coated cutting tool of the present embodiment tends to have improved wear resistance because the average thickness of the TiCN layer in the upper layer is 1.00 μm or more. In addition, in the coated cutting tool of the present embodiment, since the average thickness of the TiCN layer in the upper layer is 6.50 μm or less, the adhesion between the upper layer and the intermediate layer tends to be improved and the chipping resistance tends to be excellent. From the same viewpoint, the average thickness of the TiCN layer in the upper layer is more preferably 1.50 μm or more and 5.00 μm or less, and still more preferably 2.00 μm or more and 4.80 μm or less.

When the upper layer used in the present embodiment is in contact with the intermediate layer, it is preferable that the upper layer include at least one layer selected from the group consisting of a layer containing TICO, a layer containing TiON, and a layer containing TiCNO as the adhesion layer on a side in contact with the intermediate layer (hereinafter, also simply referred to as the "adhesion layer"). With such an adhesion layer, the upper layer used in the present embodiment tends to have improved adhesion between the upper layer and the intermediate layer, and the control of RSA1 is easy. From the same viewpoint, a TiCO layer or a TiCNO layer is more preferable as the adhesion layer.

In the upper layer used in the present embodiment, the average thickness of the adhesion layer is preferably 0.05 μm or more and 1.50 μm or less. In the coated cutting tool of the present embodiment, where the average thickness of the adhesion layer is 0.05 μm or more, the adhesion between the upper layer and the intermediate layer tends to be excellent and the chipping resistance tends to be improved, and an increase of the RSA1 tends to be easy. Meanwhile, in the coated cutting tool of the present embodiment, since the average thickness of the adhesion layer of 1.50 μm or less can suppress the reduction of the RSA2, the wear resistance tends to be improved. From the same viewpoint, the average thickness of the adhesion layer is more preferably 0.05 μm or more and 1.00 μm or less, and still more preferably 0.05 μm or more and 0.30 μm or less.

The Ti compound layer in the upper layer is composed of a Ti compound of Ti and an element of at least one kind selected from the group consisting of C, N and O. However, such Ti compound layer may contain a very small amount of components other than the above elements, as long as it provides the operation and effects of the upper layer.

Method for Forming Coating Layer

For example, the following methods can be used for forming the layers constituting the coating layer in the coated cutting tool of the present embodiment. However, the method of forming such layers is not limited thereto.

Firstly, a lower layer, being comprised of one or more Ti compound layers, is formed on a surface of a substrate. Next, from among such layers, a surface of a layer which is most distant from the substrate is oxidized. Thereafter, nuclei of the $\alpha$-$Al_2O_3$ layer are formed on the surface of the layer which is most distant from the substrate, and the $\alpha$-$Al_2O_3$ layer is formed after the nuclei have been formed. Further, an upper layer, being comprised of one or more Ti compound layers, is formed on a surface of the $\alpha$-$Al_2O_3$ layer.

Examples of the method of forming the Ti compound layer in the lower layer include, but are not particularly limited to, the following methods.

For instance, a Ti compound layer, being comprised of a Ti nitride layer (hereinafter also referred to as a "TiN layer"), can be formed by chemical vapor deposition with a raw material composition of $TiCl_4$: from 5.0 mol % or more to 10.0 mol % or less, $N_2$: from 20 mol % or more to 60 mol % or less, and $H_2$: the balance, a temperature of from 850 °C or higher to 950 °C or lower, and a pressure of from 350 hPa or higher to 450 hPa or lower.

A Ti compound layer, being comprised of a Ti carbide layer (hereinafter also referred to as a "TiC layer"), can be formed by chemical vapor deposition with a raw material composition of $TiCl_4$: from 1.5 mol % or more to 3.5 mol % or less, $CH_4$: from 3.5 mol % or more to 5.5 mol % or less, and $H_2$: the balance, a temperature of from 950 °C or higher to 1,050 °C or lower, and a pressure of from 70 hPa or higher to 80 hPa or lower.

A Ti compound layer, being comprised of a Ti carbonitride layer (hereinafter also referred to as "TiCN layer"), can be formed by chemical vapor deposition with a raw material composition of $TiCl_4$: from 5.0 mol % or more to 7.0 mol % or less, $CH_3CN$: from 0.5 mol % or more to 1.5 mol % or less, and $H_2$: the balance, a temperature of from 800 °C or higher to 900 °C or lower and a pressure of from 70 hPa or higher to 90 hPa or lower.

A Ti compound layer, being comprised of a Ti oxycarbonitride layer (hereinafter also referred to as "TiCNO layer") in the lower layer, can be formed by chemical vapor deposition with a raw material composition of $TiCl_4$: from 3.0 mol % or more to 4.0 mol % or less, CO: from 0.5 mol % or more to 1.0 mol % or less, $N_2$: from 30 mol % or more to 40 mol % or less and $H_2$: the balance, a temperature of from 950 °C or higher to 1050 °C or lower and a pressure of from 50 hPa or higher to 150 hPa or lower.

A Ti compound layer, being comprised of a Ti carboxide layer (hereinafter also referred to as a "TiCO layer"), can be formed by chemical vapor deposition with a raw material composition of $TiCl_4$: from 1.0 mol % or more to 2.0 mol % or less, CO: from 2.0 mol % or more to 3.0 mol % or less, and $H_2$: the balance, a temperature of from 950 °C or higher to 1,050 °C or lower, and a pressure of from 50 hPa or higher to 150 hPa or lower.

An intermediate layer, being comprised of an $\alpha$-$Al_2O_3$ layer (hereinafter also simply referred to as an "$Al_2O_3$ layer"), can be obtained by, for example, the method set forth below.

First, the oxidation of the surface of the layer which is most distant from the substrate among the lower layers is performed under the conditions of the raw material composition of $CO_2$: from 0.1 to 0.5 mol %, $H_2S$: from 0.05 to 0.15 mol %, and $H_2$: the balance, a temperature of from 900 to 950 °C, and a pressure of from 60 to 80 hPa (oxidation step). The oxidation treatment time in this case is preferably 1 min to 3 min.

Thereafter, nuclei of the α-$Al_2O_3$ layer are formed by chemical vapor deposition with a raw material composition of $AlCl_3$: from 1.0 mol % or more to 4.0 mol % or less, CO: from 0.05 mol % or more to 2.0 mol % or less, $CO_2$: from 1.0 mol % or more to 3.0 mol % or less, HCl: from 2.0 mol % or more to 3.0 mol % or less, and $H_2$: the balance, a temperature of from 900 °C or higher to 950 °C or lower and a pressure of from 60 hPa or higher to 80 hPa or lower (nucleation step). A preferred time of the nucleation step is from 3 to 30 minutes.

Then, the α-$Al_2O_3$ layer is formed by chemical vapor deposition with a raw material composition of $AlCl_3$: from 2.0 mol % or more to 5.0 mol % or less, $CO_2$: from 2.5 mol % or more to 4.0 mol % or less, HCl: from 2.0 mol % or more to 3.0 mol % or less, $H_2S$: from 0.6 mol % or more to 1.0 mol % or less, and $H_2$: the balance, a temperature of from 980 °C or higher to 1020 °C or lower and a pressure of from 60 hPa or higher to 80 hPa or lower (film formation step).

In order to set the texture coefficient TC(0,0,12) of the (0,0,12) plane of the α-$Al_2O_3$ layer represented by the formula (1) to the above specific range in the intermediate layer, for example, the ratio of $H_2S$ in the gas composition in the film formation step is only required to be controlled or the average thickness of the intermediate layer is only required to be controlled. More specifically, the texture coefficient TC(0,0,12) of the (0,0,12) plane of the α-$Al_2O_3$ layer represented by the formula (1) tends to be increased by, for example, increasing the ratio of $H_2S$ in the gas composition in the film formation step or increasing the average thickness of the intermediate layer.

Further, examples of the method for forming the Ti compound layer in the upper layer include, but are not particularly limited to, the following methods. Firstly, when an adhesion layer is formed on a side in contact with an intermediate layer (α-$Al_2O_3$ layer), a Ti compound layer is formed on a surface of the α-$Al_2O_3$ layer as the first step of forming the upper layer. Then, a TiCN layer is formed on the surface of the adhesion layer as the second step of forming the upper layer. Further, a Ti compound layer may be formed on a surface of the TiCN layer.

For example, when a TiCNO layer is formed on the surface of the α-$Al_2O_3$ layer as the first step of forming the upper layer, the TiCNO layer can be formed by chemical vapor deposition with a raw material composition of $TiCl_4$: from 9.0 to 11.0 mol %, $C_2H_4$: from 0.5 to 1.0 mol %, $CH_3CN$: from 1.5 to 2.0 mol %, CO: from 2.0 to 8.0 mol %, $N_2$: from 15 to 25 mol %, and $H_2$: the balance, a temperature of from 980 to 1,020 °C, and a pressure of from 80 to 100 hPa.

For example, when a TiCN layer is formed on the surface of the α-$Al_2O_3$ layer as the first step of forming the upper layer, the TiCN layer can be formed by chemical vapor deposition with a raw material composition of $TiCl_4$: from 10.0 to 12.0 mol %, $C_2H_4$: from 0.5 to 1.5 mol %, $CH_3CN$: from 1.5 to 2.5 mol %, $N_2$: from 20 to 30 mol %, and $H_2$: the balance, a temperature of from 980 to 1,020 °C, and a pressure of from 100 to 140 hPa. Here, the time for forming the TiCN layer is preferably from 2 to 8 minutes.

For example, when a TiCO layer is formed on the surface of the α-$Al_2O_3$ layer as the first step of forming the upper layer, the TiCO layer can be formed by chemical vapor deposition with a raw material composition of $TiCl_4$: from 8.0 to 10.0 mol %, $C_2H_4$: from 0.3 to 0.7 mol %, CO: from 4.0 to 10.0 mol %, and $H_2$: the balance, a temperature of from 980 to 1,020 °C, and a pressure of from 60 to 80 hPa.

When a TiCN layer is formed as the second step of forming the upper layer, the TiCN layer can be formed by chemical vapor deposition with a raw material composition of $TiCl_4$: from 9.0 to 11.0 mol %, $CH_4$: from 0.5 to 1.5 mol %, $CH_3CN$: from 1.5 to 2.5 mol %, $N_2$: from 15 to 25 mol %, and $H_2$: the balance, and a temperature of from 930 to 970 °C, and a pressure of from 70 to 120 hPa.

Further, when a TiN layer is formed on the surface of the TiCN layer, the TiN layer can be formed by chemical vapor deposition with a raw material composition of $TiCl_4$: from 5.0 to 10.0 mol %, $N_2$: from 20 to 60 mol %, and $H_2$: the balance, and a temperature of from 950 to 1050 °C, and a pressure of from 300 to 400 hPa.

In order to set the RSA1 to the above specific range in the upper layer, for example, the ratio of $C_2H_4$ in the gas composition in the first step of forming the upper layer is only required to be controlled or the ratio of CO is only required to be controlled, and when the upper layer includes an adhesion layer, the average thickness of the adhesion layer is only required to be controlled. More specifically, the RSA1 tends to be increased by, for example, increasing the ratio of $C_2H_4$ in the gas composition in the first step of forming the upper layer or increasing the ratio of CO. When the upper layer includes an adhesion layer, the RSA1 tends to be increased by, for example, increasing the average thickness of the adhesion layer.

In order to set the RSA2 to the above specific range in the upper layer, for example, the ratio of $CH_4$ in the gas composition in the second step of forming the upper layer is only required to be controlled or the ratio of $CH_3CN$ is only required to be controlled. More specifically, the RSA2 tends to be increased by increasing the ratio of $CH_4$ in the gas composition in the second step of forming the upper layer or increasing the ratio of $CH_3CN$.

In addition, when the first step of forming the upper layer is not carried out, or various conditions in the first step of forming the upper layer are out of the ranges described above, carrying out the second step of forming the upper layer under the conditions described above tends to increase the RSA2, and also tends to increase the ratio where the misorientation A is 30 degrees or more and 45 degrees or less.

The thickness of each layer in the coating layer of the coated cutting tool of the present embodiment can be measured by observing a cross-sectional structure of the coated cutting tool, using an optical microscope, a scanning electron microscope (SEM), a FE-SEM, or the like. It should be noted that, as to the average thickness of each layer in the coated cutting tool of the present embodiment, such average thickness can be obtained by: measuring the thickness of each layer at three or more locations near the position 50 μm from the edge, toward the center of the rake surface of the coated cutting tool; and calculating the arithmetic mean of the resulting measurements. Further, the composition of each layer can be measured from a cross-sectional structure of the coated cutting tool of the present embodiment, using an energy-dispersive X-ray spectroscope (EDS), a wavelength-dispersive X-ray spectroscope (WDS), or the like.

EXAMPLES

Hereinafter, the present invention will be described in greater detail with reference to examples, but the present invention is not limited to these examples.

As a substrate, a cutting insert made of a cemented carbide having a composition of 88.9% WC-7.9% Co-1.5% TIN-1.4% NbC-0.3% $Cr_3C_2$ (the above numbers are mass %) and having an insert shape of CNMG120408 was prepared. The edges of these substrates were subjected to round honing by means of an SiC brush, and surfaces of the substrates were then washed.

Invention Samples 1 to 25 and Comparative Samples 1 to 13

After the substrate surface was washed, a coating layer was formed by chemical vapor deposition. Firstly, the lower layer was formed on a surface of the substrate. Specifically, the substrate was inserted into an external heating chemical vapor deposition apparatus, and the A layer having the composition shown in Table 6 was formed under the conditions of the raw material composition, temperature and pressure shown in Table 1 on the surface of the substrate to have the average thickness shown in Table 6. Then, under the conditions of the raw material composition, temperature and pressure shown in Table 1, the B layer having the composition shown in Table 6 was formed on the surface of the A layer to have the average thickness shown in Table 6. Next, for Invention Samples 1 to 22 and 25 and Comparative Samples 1 to 13, under the conditions of the raw material composition, temperature and pressure shown in Table 1, the C layer having the composition shown in Table 6 was further formed on the surface of the B layer to have the average thickness shown in Table 6. As a result, a lower layer composed of two layers or three layers was formed. Thereafter, the surface of the lower layer was oxidized for the time shown in Table 2 under the conditions of composition, temperature and pressure shown in Table 2. Next, under the conditions of the raw material composition, temperature, and pressure shown in Table 2, and for the time shown in Table 2, nuclei of α-aluminum oxide (α-$Al_2O_3$) were formed on the surface of the lower layer subjected to the oxidation treatment. Further, under the conditions of the raw material composition, temperature and pressure shown in Table 3, the intermediate layer (α-$Al_2O_3$ layer) having the composition shown in Table 6 was formed on the surface of the lower layer and the nuclei of α-aluminum oxide (α-$Al_2O_3$) to have an average thickness shown in Table 6. Then, the upper layer was formed on the surface of the intermediate layer (α-$Al_2O_3$ layer). Specifically, firstly, as the first step of forming the upper layer, for Invention Samples 1 to 7 and 12 to 25 and Comparative Samples 1 to 5, 7 to 10, 12, and 13, the X layer (adhesion layer) having the composition shown in Table 7 was formed on the surface of the α-$Al_2O_3$ layer under the conditions of the raw material composition, temperature and pressure shown in Table 4 to have the average thickness shown in Table 7. For Invention Samples 8 to 11 and Comparative Sample 6, under the conditions of the raw material composition, temperature and pressure shown in Table 4, the first step of forming the upper layer was carried out for 5 minutes, and a part of the Y layer (TiCN layer) having the composition shown in Table 7 (average thickness: about 0.05 μm) was formed on the surface of the intermediate layer (α-$Al_2O_3$ layer). Next, as the second step of forming the upper layer, under the conditions of the raw material composition, temperature, and pressure shown in Table 5, the Y layer having the composition shown in Table 7 was formed on the surface of the X layer or the surface of the intermediate layer (α-$Al_2O_3$ layer) to have the average thickness shown in Table 7. For Invention Samples 8 to 11 and Comparative Sample 6, the Y layer (TiCN layer) having the composition shown in Table 7 was formed on the surface of the intermediate layer (α-$Al_2O_3$ layer) to have the average thickness shown in Table 7 in total of the first step and second step of forming the upper layer. Further, for Invention Samples 1 to 7, 9, 10, 12, 14, and 16 to 25 and Comparative Samples 1 to 3 and 6 to 13, under the conditions of the raw material composition, temperature, and pressure shown in Table 1, the Z layer having the composition shown in Table 7 was formed on the surface of the Y layer to have the average thickness shown in Table 7. In this way, coated cutting tools of Invention Samples 1 to 25 and Comparative Samples 1 to 13 were obtained.

The thickness of each of the layers of each of the obtained samples was obtained as set forth below. That is, using an FE-SEM, such average thickness was obtained by: measuring the thickness of each layer at each of the three locations from the cross-sectional surface near the position 50 μm from the edge of the coated cutting tool, toward the center of the rake surface thereof; and calculating the arithmetic mean of the resulting measurements. The composition of each layer of the obtained samples was measured using EDS in a cross section in the vicinity of the position from the edge of the coated cutting tool to 50 μm toward the center of the rake face.

TABLE 1

| | Composition of each layer | Temperature (°C) | Pressure (hPa) | Raw material composition (mol %) |
|---|---|---|---|---|
| Lower layer | TiN | 900 | 400 | $TiCl_4$: 7.5%, $N_2$: 40%, $H_2$: 52.5% |
| | TiC | 1000 | 75 | $TiCl_4$: 2.4%, $CH_4$: 4.6%, $H_2$: 93.0% |
| | TiCN | 850 | 80 | $TiCl_4$: 6.0%, $CH_3CN$: 1.15%, $H_2$: 92.85% |
| | TiCNO | 1000 | 100 | $TiCl_4$: 3.5%, CO: 0.7%, $N_2$: 35.5%, $H_2$: 60.3% |
| | TiCO | 1000 | 80 | $TiCl_4$: 1.3%, CO: 2.7%, $H_2$: 96.0% |
| Upper layer | TiN | 1000 | 350 | $TiCl_4$: 7.5%, $N_2$: 40%, $H_2$: 52.5% |

* Layers other than TiN in the upper layer are formed under the conditions described in Tables 4 and 5.

TABLE 2

| Step | Temperature (°C) | Pressure (hPa) | Raw material composition (mol %) | Time (min) |
|---|---|---|---|---|
| Oxidation step | 920 | 70 | $CO_2$: 0.3%, $H_2S$: 0.1%, $H_2$: 99.6% | 2 |
| Nucleation step | 920 | 70 | $AlCl_3$: 3.5%, $CO_2$: 2.0%, CO: 1.0%, HCl: 2.5%, $H_2$: 91.0% | 4 |
| Film formation step | The layer was formed under the conditions described in Table 3. | | | |

TABLE 3

| | Intermediate layer (film formation step) | | | | | | |
|---|---|---|---|---|---|---|---|
| | Temperature | Pressure | Raw material composition (mol %) | | | | |
| Sample Number | (°C) | (hPa) | $AlCl_3$ | $CO_2$ | HCl | $H_2S$ | $H_2$ |
| Invention Sample 1 | 1010 | 70 | 3.5 | 3.5 | 2.5 | 0.8 | 89.7 |
| Invention Sample 2 | 1010 | 70 | 3.5 | 3.5 | 2.5 | 0.8 | 89.7 |
| Invention Sample 3 | 1000 | 70 | 2.5 | 3.5 | 2.5 | 0.9 | 90.6 |
| Invention Sample 4 | 980 | 80 | 3.5 | 4.0 | 2.5 | 0.8 | 89.2 |
| Invention Sample 5 | 980 | 80 | 3.5 | 3.5 | 3.0 | 0.7 | 89.3 |
| Invention Sample 6 | 1010 | 60 | 3.0 | 3.5 | 2.5 | 0.8 | 90.2 |
| Invention Sample 7 | 1010 | 60 | 3.5 | 3.5 | 2.0 | 0.8 | 90.2 |
| Invention Sample 8 | 1000 | 70 | 3.0 | 3.5 | 2.5 | 0.8 | 90.2 |
| Invention Sample 9 | 1000 | 70 | 3.5 | 3.5 | 2.5 | 0.7 | 89.8 |
| Invention Sample 10 | 990 | 80 | 2.5 | 3.5 | 2.5 | 0.8 | 90.7 |
| Invention Sample 11 | 1000 | 70 | 3.5 | 3.5 | 2.0 | 0.8 | 90.2 |
| Invention Sample 12 | 980 | 60 | 2.0 | 3.5 | 2.5 | 0.6 | 91.4 |
| Invention Sample 13 | 980 | 70 | 3.5 | 3.5 | 2.5 | 0.6 | 89.9 |
| Invention Sample 14 | 1000 | 70 | 5.0 | 2.5 | 3.0 | 0.8 | 88.7 |
| Invention Sample 15 | 1000 | 60 | 3.5 | 3.5 | 2.5 | 0.8 | 89.7 |
| Invention Sample 16 | 1000 | 60 | 4.5 | 3.0 | 3.0 | 0.6 | 88.9 |
| Invention Sample 17 | 1010 | 70 | 3.5 | 3.5 | 2.5 | 0.9 | 89.6 |
| Invention Sample 18 | 1000 | 70 | 3.5 | 3.5 | 2.5 | 0.8 | 89.7 |
| Invention Sample 19 | 1000 | 60 | 3.5 | 3.0 | 2.0 | 0.8 | 90.7 |
| Invention Sample 20 | 1000 | 70 | 3.5 | 3.5 | 2.5 | 0.8 | 89.7 |
| Invention Sample 21 | 1020 | 70 | 3.5 | 4.0 | 2.5 | 0.7 | 89.3 |
| Invention Sample 22 | 980 | 80 | 2.5 | 4.0 | 3.0 | 0.6 | 89.9 |
| Invention Sample 23 | 1000 | 80 | 2.0 | 3.5 | 2.5 | 0.6 | 91.4 |
| Invention Sample 24 | 1000 | 70 | 5.0 | 3.5 | 2.0 | 1.0 | 88.5 |
| Invention Sample 25 | 1020 | 70 | 3.5 | 3.5 | 2.5 | 1.0 | 89.5 |
| Comparative Sample 1 | 1000 | 70 | 5.0 | 3.5 | 3.0 | 0.8 | 87.7 |
| Comparative Sample 2 | 980 | 80 | 3.5 | 2.5 | 2.5 | 0.8 | 90.7 |
| Comparative Sample 3 | 1000 | 70 | 3.0 | 3.5 | 2.5 | 0.8 | 90.2 |
| Comparative Sample 4 | 1000 | 60 | 3.5 | 3.5 | 3.0 | 0.8 | 89.2 |
| Comparative Sample 5 | 1000 | 70 | 3.5 | 3.5 | 2.5 | 0.8 | 89.7 |
| Comparative Sample 6 | 1020 | 70 | 2.5 | 4.0 | 2.5 | 1.1 | 89.9 |
| Comparative Sample 7 | 1000 | 70 | 3.5 | 3.5 | 2.0 | 0.8 | 90.2 |
| Comparative Sample 8 | 980 | 80 | 3.5 | 3.5 | 2.5 | 0.8 | 89.7 |
| Comparative Sample 9 | 1000 | 70 | 4.5 | 3.5 | 4.0 | 0.2 | 87.8 |
| Comparative Sample 10 | 1000 | 60 | 3.5 | 3.5 | 2.5 | 0.8 | 89.7 |
| Comparative Sample 11 | 1020 | 60 | 3.0 | 2.5 | 3.0 | 1.0 | 90.5 |
| Comparative Sample 12 | 1010 | 70 | 3.5 | 3.5 | 2.5 | 0.8 | 89.7 |
| Comparative Sample 13 | 1000 | 70 | 4.0 | 3.5 | 2.5 | 0.4 | 89.6 |

TABLE 4

| | Upper layer (first step) | | | | | | | |
|---|---|---|---|---|---|---|---|---|
| | Temperature | Pressure | Raw material composition (mol %) | | | | | |
| Sample Number | (°C) | (hPa) | $TiCl_4$ | $C_2H_4$ | $CH_3CN$ | CO | $N_2$ | $H_2$ |
| Invention Sample 1 | 1000 | 90 | 10.0 | 0.7 | 1.5 | 4.0 | 20.0 | 63.8 |
| Invention Sample 2 | 980 | 100 | 9.0 | 0.5 | 1.5 | 4.0 | 25.0 | 60.0 |
| Invention Sample 3 | 1000 | 100 | 11.0 | 0.9 | 1.5 | 7.0 | 20.0 | 59.6 |
| Invention Sample 4 | 1020 | 90 | 11.0 | 1.0 | 1.5 | 8.0 | 25.0 | 53.5 |
| Invention Sample 5 | 1010 | 90 | 9.5 | 0.7 | 1.5 | 6.0 | 20.0 | 62.3 |
| Invention Sample 6 | 990 | 100 | 9.5 | 0.7 | 1.5 | 3.0 | 15.0 | 70.3 |

TABLE 4-continued

| | Upper layer (first step) | | | | | | | |
|---|---|---|---|---|---|---|---|---|
| | Temperature | Pressure | Raw material composition (mol %) | | | | | |
| Sample Number | (°C) | (hPa) | $TiCl_4$ | $C_2H_4$ | $CH_3CN$ | CO | $N_2$ | $H_2$ |
| Invention Sample 7 | 980 | 100 | 9.0 | 0.6 | 1.5 | 3.0 | 20.0 | 65.9 |
| Invention Sample 8 | 1000 | 120 | 11.0 | 1.0 | 2.0 | 0.0 | 25.0 | 61.0 |
| Invention Sample 9 | 1020 | 120 | 11.0 | 1.0 | 2.0 | 0.0 | 25.0 | 61.0 |
| Invention Sample 10 | 1000 | 120 | 11.0 | 1.0 | 2.0 | 0.0 | 25.0 | 61.0 |
| Invention Sample 11 | 1000 | 120 | 11.0 | 1.0 | 2.0 | 0.0 | 25.0 | 61.0 |
| Invention Sample 12 | 1020 | 80 | 10.0 | 0.7 | 2.0 | 5.0 | 20.0 | 62.3 |
| Invention Sample 13 | 1000 | 80 | 10.0 | 0.8 | 2.0 | 5.0 | 20.0 | 62.2 |
| Invention Sample 14 | 990 | 80 | 10.0 | 0.6 | 2.0 | 6.0 | 20.0 | 61.4 |
| Invention Sample 15 | 1000 | 80 | 10.0 | 0.6 | 2.0 | 6.0 | 20.0 | 61.4 |
| Invention Sample 16 | 980 | 80 | 10.0 | 0.7 | 2.0 | 7.0 | 20.0 | 60.3 |
| Invention Sample 17 | 1000 | 90 | 10.0 | 0.7 | 2.0 | 4.0 | 25.0 | 58.3 |
| Invention Sample 18 | 1000 | 90 | 9.5 | 0.8 | 2.0 | 3.0 | 25.0 | 59.7 |
| Invention Sample 19 | 1000 | 90 | 9.5 | 0.7 | 2.0 | 2.0 | 15.0 | 70.8 |
| Invention Sample 20 | 1000 | 80 | 10.5 | 0.7 | 2.0 | 2.0 | 15.0 | 69.8 |
| Invention Sample 21 | 1000 | 80 | 10.5 | 0.7 | 2.0 | 2.0 | 15.0 | 69.8 |
| Invention Sample 22 | 980 | 70 | 9.0 | 0.5 | 0.0 | 4.0 | 0.0 | 86.5 |
| Invention Sample 23 | 990 | 70 | 9.0 | 0.5 | 0.0 | 8.0 | 0.0 | 82.5 |
| Invention Sample 24 | 980 | 70 | 9.0 | 0.5 | 0.0 | 10.0 | 0.0 | 80.5 |
| Invention Sample 25 | 1000 | 70 | 9.0 | 0.5 | 0.0 | 4.0 | 0.0 | 86.5 |
| Comparative Sample 1 | 980 | 90 | 10.0 | 0.2 | 2.0 | 4.0 | 15.0 | 68.8 |
| Comparative Sample 2 | 1000 | 100 | 11.0 | 0.7 | 2.0 | 4.0 | 20.0 | 62.3 |
| Comparative Sample 3 | 950 | 100 | 10.0 | 0.1 | 2.0 | 2.0 | 20.0 | 65.9 |
| Comparative Sample 4 | 1000 | 90 | 10.0 | 0.8 | 2.0 | 6.0 | 20.0 | 61.2 |
| Comparative Sample 5 | 1000 | 90 | 11.0 | 0.7 | 2.0 | 4.0 | 20.0 | 62.3 |
| Comparative Sample 6 | 990 | 120 | 10.0 | 0.3 | 2.0 | 0.0 | 15.0 | 72.7 |
| Comparative Sample 7 | 1000 | 80 | 9.0 | 0.7 | 2.0 | 8.0 | 20.0 | 60.3 |
| Comparative Sample 8 | 1020 | 110 | 10.0 | 0.9 | 2.0 | 8.0 | 25.0 | 54.1 |
| Comparative Sample 9 | 1000 | 90 | 9.0 | 0.7 | 2.0 | 4.0 | 20.0 | 64.3 |
| Comparative Sample 10 | 970 | 90 | 10.0 | 0.1 | 2.0 | 4.0 | 15.0 | 68.9 |
| Comparative Sample 11 | | | | — | | | | |
| Comparative Sample 12 | 980 | 90 | 10.0 | 0.3 | 2.0 | 4.0 | 15.0 | 68.7 |
| Comparative Sample 13 | 1000 | 90 | 10.0 | 0.9 | 2.0 | 6.0 | 25.0 | 56.1 |

* "—" in this table indicates that the corresponding step was not carried out.

TABLE 5

| | Upper layer (second step) | | | | | | |
|---|---|---|---|---|---|---|---|
| | Temperature | Pressure | Raw material composition (mol %) | | | | |
| Sample Number | (°C) | (hPa) | $TiCl_4$ | $CH_4$ | $CH_3CN$ | $N_2$ | $H_2$ |
| Invention Sample 1 | 950 | 100 | 10.0 | 1.0 | 2.0 | 20.0 | 67.0 |
| Invention Sample 2 | 950 | 100 | 10.0 | 1.0 | 2.0 | 20.0 | 67.0 |
| Invention Sample 3 | 950 | 100 | 10.0 | 1.0 | 2.0 | 20.0 | 67.0 |
| Invention Sample 4 | 970 | 90 | 10.0 | 0.5 | 1.8 | 15.0 | 72.7 |
| Invention Sample 5 | 970 | 90 | 9.0 | 0.5 | 1.5 | 15.0 | 74.0 |
| Invention Sample 6 | 930 | 70 | 11.0 | 1.3 | 2.0 | 20.0 | 65.7 |
| Invention Sample 7 | 930 | 80 | 11.0 | 1.5 | 2.5 | 25.0 | 60.0 |
| Invention Sample 8 | 950 | 110 | 10.0 | 0.7 | 2.0 | 20.0 | 67.3 |
| Invention Sample 9 | 970 | 120 | 10.0 | 1.0 | 1.8 | 20.0 | 67.2 |
| Invention Sample 10 | 970 | 120 | 11.0 | 1.2 | 2.1 | 25.0 | 60.7 |
| Invention Sample 11 | 970 | 100 | 10.0 | 1.0 | 1.5 | 20.0 | 67.5 |
| Invention Sample 12 | 960 | 120 | 9.0 | 0.8 | 1.8 | 20.0 | 68.4 |
| Invention Sample 13 | 960 | 100 | 10.0 | 1.0 | 1.8 | 20.0 | 67.2 |
| Invention Sample 14 | 960 | 100 | 10.0 | 1.2 | 2.0 | 20.0 | 66.8 |
| Invention Sample 15 | 960 | 90 | 10.0 | 1.0 | 2.0 | 20.0 | 67.0 |
| Invention Sample 16 | 950 | 90 | 10.0 | 1.0 | 2.3 | 20.0 | 66.7 |
| Invention Sample 17 | 950 | 100 | 10.0 | 1.0 | 2.0 | 20.0 | 67.0 |
| Invention Sample 18 | 940 | 100 | 9.0 | 0.6 | 2.0 | 20.0 | 68.4 |
| Invention Sample 19 | 940 | 100 | 9.0 | 0.9 | 2.0 | 20.0 | 68.1 |
| Invention Sample 20 | 940 | 100 | 10.0 | 0.7 | 1.8 | 20.0 | 67.5 |
| Invention Sample 21 | 940 | 70 | 10.0 | 1.0 | 1.5 | 20.0 | 67.5 |
| Invention Sample 22 | 950 | 80 | 11.0 | 1.5 | 2.5 | 25.0 | 60.0 |
| Invention Sample 23 | 950 | 100 | 10.0 | 0.7 | 1.7 | 15.0 | 72.6 |
| Invention Sample 24 | 970 | 100 | 10.0 | 0.5 | 1.5 | 15.0 | 73.0 |
| Invention Sample 25 | 950 | 100 | 10.0 | 0.7 | 2.0 | 15.0 | 72.3 |
| Comparative Sample 1 | 950 | 100 | 11.0 | 1.0 | 1.5 | 20.0 | 66.5 |
| Comparative Sample 2 | 980 | 100 | 9.0 | 0.6 | 1.0 | 15.0 | 74.4 |
| Comparative Sample 3 | 1000 | 100 | 11.0 | 0.3 | 1.0 | 25.0 | 62.7 |

TABLE 5-continued

| Sample Number | Upper layer (second step) Temperature (°C) | Pressure (hPa) | Raw material composition (mol %) $TiCl_4$ | $CH_4$ | $CH_3CN$ | $N_2$ | $H_2$ |
|---|---|---|---|---|---|---|---|
| Comparative Sample 4 | 950 | 100 | 10.0 | 1.0 | 2.0 | 20.0 | 67.0 |
| Comparative Sample 5 | 970 | 100 | 10.0 | 1.0 | 2.0 | 20.0 | 67.0 |
| Comparative Sample 6 | 970 | 100 | 11.0 | 1.5 | 2.0 | 20.0 | 65.5 |
| Comparative Sample 7 | 950 | 100 | 9.0 | 0.7 | 1.2 | 15.0 | 74.1 |
| Comparative Sample 8 | 950 | 100 | 9.0 | 0.0 | 1.0 | 15.0 | 75.0 |
| Comparative Sample 9 | 950 | 100 | 9.0 | 0.5 | 1.3 | 20.0 | 69.2 |
| Comparative Sample 10 | 980 | 100 | 11.0 | 0.3 | 1.5 | 25.0 | 62.2 |
| Comparative Sample 11 | 1000 | 100 | 11.0 | 1.5 | 2.5 | 20.0 | 65.0 |
| Comparative Sample 12 | 950 | 100 | 10.0 | 1.5 | 1.5 | 20.0 | 67.0 |
| Comparative Sample 13 | 930 | 100 | 10.0 | 0.8 | 1.0 | 15.0 | 73.2 |

TABLE 6

| | Coating layer | | | | | | | | | |
|---|---|---|---|---|---|---|---|---|---|---|
| | Lower layer | | | | | | | Intermediate layer | | |
| | A layer | | B layer | | C layer | | Average thickness | | | |
| Sample Number | Composition | Average thickness (μm) | Composition | Average thickness (μm) | Composition | Average thickness (μm) | of entire lower layer (μm) | Composition | crystal system | Average thickness (μm) |
| Invention Sample 1 | TiN | 0.30 | TiCN | 6.00 | TiCNO | 0.20 | 6.50 | $Al_2O_3$ | α | 8.00 |
| Invention Sample 2 | TiN | 0.30 | TiCN | 6.00 | TiCNO | 0.20 | 6.50 | $Al_2O_3$ | α | 8.00 |
| Invention Sample 3 | TiN | 0.30 | TiCN | 6.00 | TiCNO | 0.20 | 6.50 | $Al_2O_3$ | α | 8.00 |
| Invention Sample 4 | TiN | 0.30 | TiCN | 6.00 | TiCNO | 0.20 | 6.50 | $Al_2O_3$ | α | 8.00 |
| Invention Sample 5 | TiN | 0.30 | TiCN | 6.00 | TiCO | 0.20 | 6.50 | $Al_2O_3$ | α | 8.00 |
| Invention Sample 6 | TiN | 0.30 | TiCN | 6.00 | TiCO | 0.20 | 6.50 | $Al_2O_3$ | α | 8.00 |
| Invention Sample 7 | TiN | 0.30 | TiCN | 6.00 | TiCO | 0.20 | 6.50 | $Al_2O_3$ | α | 8.00 |
| Invention Sample 8 | TiN | 0.30 | TiCN | 4.00 | TiCNO | 0.20 | 4.50 | $Al_2O_3$ | α | 8.00 |
| Invention Sample 9 | TiN | 0.30 | TiCN | 4.00 | TiCNO | 0.20 | 4.50 | $Al_2O_3$ | α | 8.00 |
| Invention Sample 10 | TiN | 0.30 | TiCN | 4.00 | TiCO | 0.20 | 4.50 | $Al_2O_3$ | α | 8.00 |
| Invention Sample 11 | TiN | 0.30 | TiCN | 4.00 | TiCNO | 0.20 | 4.50 | $Al_2O_3$ | α | 8.00 |
| Invention Sample 12 | TiN | 0.30 | TiCN | 3.00 | TiCNO | 0.20 | 3.50 | $Al_2O_3$ | α | 3.20 |
| Invention Sample 13 | TiN | 0.30 | TiCN | 6.00 | TiCNO | 0.20 | 6.50 | $Al_2O_3$ | α | 5.50 |
| Invention Sample 14 | TiN | 0.30 | TiCN | 6.00 | TiCNO | 0.20 | 6.50 | $Al_2O_3$ | α | 14.60 |
| Invention Sample 15 | TiN | 0.30 | TiCN | 14.50 | TiCNO | 0.20 | 15.00 | $Al_2O_3$ | α | 8.00 |
| Invention Sample 16 | TiN | 0.30 | TiCN | 12.00 | TiCNO | 0.20 | 12.50 | $Al_2O_3$ | α | 13.00 |
| Invention Sample 17 | TiC | 0.20 | TiCN | 6.00 | TiCNO | 0.20 | 6.40 | $Al_2O_3$ | α | 8.00 |
| Invention Sample 18 | TiN | 1.50 | TiCN | 6.00 | TiCNO | 0.50 | 8.00 | $Al_2O_3$ | α | 8.00 |
| Invention Sample 19 | TiN | 0.30 | TiCN | 8.00 | TiCO | 0.50 | 8.80 | $Al_2O_3$ | α | 6.00 |
| Invention Sample 20 | TiN | 0.30 | TiCN | 8.00 | TiCNO | 0.50 | 8.80 | $Al_2O_3$ | α | 6.00 |
| Invention Sample 21 | TiN | 0.30 | TiCN | 8.00 | TiCNO | 0.50 | 8.80 | $Al_2O_3$ | α | 6.00 |
| Invention Sample 22 | TiN | 0.30 | TiCN | 8.50 | TiCNO | 0.50 | 9.30 | $Al_2O_3$ | α | 4.00 |
| Invention Sample 23 | TiN | 0.30 | TiCN | 9.00 | — | — | 9.30 | $Al_2O_3$ | α | 6.00 |

TABLE 6-continued

| Sample Number | Coating layer | | | | | | | | | | |
|---|---|---|---|---|---|---|---|---|---|---|---|
| | Lower layer | | | | | | | Intermediate layer | | | |
| | A layer | | B layer | | C layer | | Average thickness of entire lower layer (μm) | | | | |
| | Composition | Average thickness (μm) | Composition | Average thickness (μm) | Composition | Average thickness (μm) | | Composition | crystal system | Average thickness (μm) |
| Invention Sample 24 | TiN | 0.30 | TiCN | 9.00 | — | — | 9.30 | $Al_2O_3$ | α | 10.00 |
| Invention Sample 25 | TiN | 0.30 | TiCN | 9.50 | TiCNO | 0.50 | 10.30 | $Al_2O_3$ | α | 12.00 |
| Comparative Sample 1 | TiN | 0.30 | TiCN | 6.00 | TiCNO | 0.20 | 6.50 | $Al_2O_3$ | α | 8.00 |
| Comparative Sample 2 | TiN | 0.30 | TiCN | 6.00 | TiCNO | 0.20 | 6.50 | $Al_2O_3$ | α | 8.00 |
| Comparative Sample 3 | TiN | 0.30 | TiCN | 6.00 | TiCNO | 0.20 | 6.50 | $Al_2O_3$ | α | 8.00 |
| Comparative Sample 4 | TiN | 0.30 | TiCN | 6.00 | TiCNO | 0.20 | 6.50 | $Al_2O_3$ | α | 8.00 |
| Comparative Sample 5 | TiN | 0.30 | TiCN | 6.00 | TiCNO | 0.20 | 6.50 | $Al_2O_3$ | α | 8.00 |
| Comparative Sample 6 | TiN | 0.30 | TiCN | 6.00 | TiCNO | 0.20 | 6.50 | $Al_2O_3$ | α | 8.00 |
| Comparative Sample 7 | TiN | 0.30 | TiCN | 6.00 | TiCNO | 0.20 | 6.50 | $Al_2O_3$ | α | 8.00 |
| Comparative Sample 8 | TiN | 0.30 | TiCN | 6.00 | TiCNO | 0.20 | 6.50 | $Al_2O_3$ | α | 8.00 |
| Comparative Sample 9 | TiN | 0.30 | TiCN | 6.00 | TiCNO | 0.20 | 6.50 | $Al_2O_3$ | α | 8.00 |
| Comparative Sample 10 | TiN | 0.30 | TiCN | 6.00 | TiCNO | 0.20 | 6.50 | $Al_2O_3$ | α | 8.00 |
| Comparative Sample 11 | TiN | 0.30 | TiCN | 6.00 | TiCNO | 0.20 | 6.50 | $Al_2O_3$ | α | 8.00 |
| Comparative Sample 12 | TiN | 0.30 | TiCN | 4.00 | TiCNO | 0.20 | 4.50 | $Al_2O_3$ | α | 5.00 |
| Comparative Sample 13 | TiN | 0.30 | TiCN | 10.00 | TiCNO | 0.20 | 10.50 | $Al_2O_3$ | α | 12.00 |

* "—" in this table indicates that the corresponding layer was not formed.

TABLE 7

| Sample Number | Coating layer | | | | | | | |
|---|---|---|---|---|---|---|---|---|
| | Upper layer | | | | | | | |
| | X layer (adhesion layer) | | Y layer | | Z layer | | Average thickness of entire upper layer (μm) | Average thickness of entire coating layer (μm) |
| | Composition | Average thickness (μm) | Composition | Average thickness (μm) | Composition | Average thickness (μm) | | |
| Invention Sample 1 | TiCNO | 0.10 | TiCN | 3.40 | TiN | 0.20 | 3.70 | 18.20 |
| Invention Sample 2 | TiCNO | 0.10 | TiCN | 3.40 | TiN | 0.20 | 3.70 | 18.20 |
| Invention Sample 3 | TiCNO | 0.10 | TiCN | 3.40 | TiN | 0.20 | 3.70 | 18.20 |
| Invention Sample 4 | TiCNO | 0.10 | TiCN | 3.40 | TiN | 0.20 | 3.70 | 18.20 |
| Invention Sample 5 | TiCNO | 0.10 | TiCN | 3.40 | TiN | 0.20 | 3.70 | 18.20 |
| Invention Sample 6 | TiCNO | 0.10 | TiCN | 3.40 | TiN | 0.20 | 3.70 | 18.20 |
| Invention Sample 7 | TiCNO | 0.10 | TiCN | 3.40 | TiN | 0.20 | 3.70 | 18.20 |
| Invention Sample 8 | — | — | TiCN | 1.00 | — | — | 1.00 | 13.50 |
| Invention Sample 9 | — | — | TiCN | 2.00 | TiN | 0.20 | 2.20 | 14.70 |
| Invention Sample 10 | — | — | TiCN | 4.80 | TiN | 0.20 | 5.00 | 17.50 |

TABLE 7-continued

| Sample Number | Coating layer / Upper layer / X layer (adhesion layer) Composition | X layer Average thickness (μm) | Y layer Composition | Y layer Average thickness (μm) | Z layer Composition | Z layer Average thickness (μm) | Average thickness of entire upper layer (μm) | Average thickness of entire coating layer (μm) |
|---|---|---|---|---|---|---|---|---|
| Invention Sample 11 | — | — | TiCN | 6.50 | — | — | 6.50 | 19.00 |
| Invention Sample 12 | TiCNO | 0.05 | TiCN | 3.40 | TiN | 0.20 | 3.65 | 10.35 |
| Invention Sample 13 | TiCNO | 0.05 | TiCN | 1.50 | — | — | 1.55 | 13.55 |
| Invention Sample 14 | TiCNO | 0.05 | TiCN | 3.40 | TiN | 0.50 | 3.95 | 25.05 |
| Invention Sample 15 | TiCNO | 0.05 | TiCN | 3.40 | — | — | 3.45 | 26.45 |
| Invention Sample 16 | TiCNO | 0.05 | TiCN | 4.00 | TiN | 0.40 | 4.45 | 29.95 |
| Invention Sample 17 | TiCNO | 0.10 | TiCN | 1.00 | TiN | 0.10 | 1.20 | 15.60 |
| Invention Sample 18 | TiCNO | 0.10 | TiCN | 3.40 | TiN | 0.20 | 3.70 | 19.70 |
| Invention Sample 19 | TiCNO | 0.30 | TiCN | 3.30 | TiN | 0.20 | 3.80 | 18.60 |
| Invention Sample 20 | TiCNO | 1.00 | TiCN | 5.00 | TiN | 0.50 | 6.50 | 21.30 |
| Invention Sample 21 | TiCNO | 1.50 | TiCN | 3.20 | TiN | 0.10 | 4.80 | 19.60 |
| Invention Sample 22 | TiCO | 0.30 | TiCN | 2.00 | TiN | 0.20 | 2.50 | 15.80 |
| Invention Sample 23 | TiCO | 0.30 | TiCN | 2.00 | TiN | 0.20 | 2.50 | 17.80 |
| Invention Sample 24 | TiCO | 0.30 | TiCN | 2.00 | TiN | 0.20 | 2.50 | 21.80 |
| Invention Sample 25 | TiCO | 0.30 | TiCN | 2.00 | TiN | 0.20 | 2.50 | 24.80 |
| Comparative Sample 1 | TiCNO | 0.10 | TiCN | 3.40 | TiN | 0.20 | 3.70 | 18.20 |
| Comparative Sample 2 | TiCNO | 0.10 | TiCN | 3.40 | TiN | 0.20 | 3.70 | 18.20 |
| Comparative Sample 3 | TiCNO | 0.10 | TiCN | 3.40 | TiN | 0.20 | 3.70 | 18.20 |
| Comparative Sample 4 | TiCNO | 0.30 | TiCN | 7.00 | — | — | 7.30 | 21.80 |
| Comparative Sample 5 | TiCNO | 0.10 | TiCN | 0.40 | — | — | 0.50 | 15.00 |
| Comparative Sample 6 | — | — | TiCN | 1.00 | TiN | 0.20 | 1.20 | 15.70 |
| Comparative Sample 7 | TiCNO | 0.10 | TiCN | 6.00 | TiN | 0.20 | 6.30 | 20.80 |
| Comparative Sample 8 | TiCNO | 2.00 | TiCN | 4.00 | TiN | 0.20 | 6.20 | 20.70 |
| Comparative Sample 9 | TiCNO | 0.10 | TiCN | 3.40 | TiN | 0.20 | 3.70 | 18.20 |
| Comparative Sample 10 | TiCNO | 0.10 | TiCN | 3.40 | TiN | 0.20 | 3.70 | 18.20 |
| Comparative Sample 11 | — | — | TiCN | 3.40 | TiN | 0.20 | 3.60 | 18.10 |
| Comparative Sample 12 | TiCNO | 0.10 | TiCN | 3.40 | TiN | 0.20 | 3.70 | 13.20 |
| Comparative Sample 13 | TiCNO | 0.10 | TiCN | 3.40 | TiN | 0.20 | 3.70 | 26.20 |

* "—" in this table indicates that the corresponding layer was not formed.

[RSA1 and RSA2]

In the obtained samples, the cross section of the upper layer in a direction perpendicular to the surface of the substrate was exposed. The obtained cross section was subjected to mirror polishing, and the mirror polished surface was observed by a field emission type scanning electron microscope (FE-SEM). By using an electron backscatter diffraction pattern apparatus (EBSD) incorporated in FE-SEM, the misorientation A formed by a normal to a (220) plane of each grain having a cubic crystalline structure and a normal to the surface of the substrate was measured. The ratio of the cross-sectional area of a region where the misorientation A is 0 degrees or more and less than 10 degrees to the sum of the cross-sectional areas of the upper layer analyzed (the sum of the areas of the cross sections of grains in the upper layer having a misorientation A in the range of 0 degrees or more and 45 degrees or less: $RSA_{Total}$) of 100 area % was taken as RSA1 (unit: area %). The ratio of the cross-sectional area of a region where the misorientation A is 20 degrees or more and less than 30 degrees to the sum of the cross-sectional areas of the upper layer analyzed of 100 area % was taken as RSA2 (unit: area %). Specifically, firstly, the cross-sectional areas of grains having a misorientation A in the range of 0 degrees or more and 45 degrees or less were divided into divisions with a 5-degree pitch, and the area of grain cross sections in each division was determined. Then, the sum of the cross-sectional areas of grains for each division among a division with the misorientation A of 0 degrees or more to less than 10 degrees, a division of 10 degrees or more to less than 20 degrees, a division of 20 degrees or more to less than 30 degrees, and a division of 30 degrees or more to 45 degrees or less was determined. The sum of the cross-sectional areas of grains with 0 degrees or more and 45 degrees or less was taken as 100 area %. A ratio of the sum of the cross-sectional areas of grains with the misorientation A in the range of 0 degrees or more and less than 10 degrees in each of these divisions to $RSA_{Total}$ was taken as RSA1, and a ratio of the sum of the cross-sectional areas of grains with the misorientation A in the range of 20 degrees or more and less than 30 degree to $RSA_{Total}$ was taken as RSA2. The above measurement results are shown in the following Table 8. The measurement by EBSD was performed as follows. The sample was set in the FE-SEM. The sample was irradiated with an electron beam with an acceleration voltage of 15 KV and an irradiation current of 1.0 nA at an incident angle of 70 degrees. In the measurement range of 10 μm×50 μm, the misorientation and cross-sectional area of each grain were measured by setting the EBSD to a step size of 0.1 μm. The cross-sectional area of grains of the upper layer within the measurement range was taken as the total of pixels corresponding to the area. That is, the sum of the cross-sectional areas of grains in each division for each 10-degree or 15-degree pitch based on the misorientation A of the grains in each layer was determined by summing up the pixels occupied by the grain cross-section corresponding to each division and converting the sum to the area.

TABLE 8

| | Coating layer Upper layer (220) Misorientation (area %) | | | | |
|---|---|---|---|---|---|
| Sample Number | 0 degrees or more and less than 10 degrees RSA1 | 10 degrees or more and less than 20 degrees | 20 degrees or more and less than 30 degrees RSA2 | 30 degrees or more and 45 degrees or less | RSA1 + RSA2 |
| Invention Sample 1 | 32 | 20 | 34 | 14 | 66 |
| Invention Sample 2 | 26 | 18 | 35 | 21 | 61 |
| Invention Sample 3 | 45 | 14 | 33 | 8 | 78 |
| Invention Sample 4 | 61 | 9 | 26 | 4 | 87 |
| Invention Sample 5 | 34 | 21 | 27 | 18 | 61 |
| Invention Sample 6 | 30 | 8 | 50 | 12 | 80 |
| Invention Sample 7 | 25 | 4 | 65 | 6 | 90 |
| Invention Sample 8 | 30 | 19 | 34 | 17 | 64 |
| Invention Sample 9 | 32 | 19 | 33 | 16 | 65 |
| Invention Sample 10 | 31 | 21 | 36 | 12 | 67 |
| Invention Sample 11 | 33 | 20 | 34 | 13 | 67 |
| Invention Sample 12 | 38 | 17 | 32 | 13 | 70 |
| Invention Sample 13 | 40 | 16 | 33 | 11 | 73 |
| Invention Sample 14 | 34 | 12 | 42 | 12 | 76 |
| Invention Sample 15 | 34 | 14 | 38 | 14 | 72 |
| Invention Sample 16 | 35 | 14 | 40 | 11 | 75 |
| Invention Sample 17 | 32 | 19 | 34 | 15 | 66 |
| Invention Sample 18 | 31 | 20 | 31 | 18 | 62 |
| Invention Sample 19 | 33 | 19 | 32 | 16 | 65 |
| Invention Sample 20 | 34 | 22 | 31 | 13 | 65 |
| Invention Sample 21 | 36 | 22 | 29 | 13 | 65 |
| Invention Sample 22 | 27 | 10 | 53 | 10 | 80 |
| Invention Sample 23 | 36 | 23 | 27 | 14 | 63 |
| Invention Sample 24 | 48 | 20 | 28 | 4 | 76 |
| Invention Sample 25 | 25 | 9 | 46 | 20 | 71 |
| Comparative Sample 1 | 20 | 25 | 26 | 29 | 46 |
| Comparative Sample 2 | 36 | 24 | 19 | 21 | 55 |
| Comparative Sample 3 | 18 | 25 | 22 | 35 | 40 |
| Comparative Sample 4 | 36 | 15 | 34 | 15 | 70 |
| Comparative Sample 5 | 31 | 22 | 31 | 16 | 62 |
| Comparative Sample 6 | 16 | 18 | 42 | 24 | 58 |
| Comparative Sample 7 | 44 | 20 | 17 | 19 | 61 |
| Comparative Sample 8 | 56 | 21 | 17 | 6 | 73 |
| Comparative Sample 9 | 31 | 33 | 20 | 16 | 51 |
| Comparative Sample 10 | 20 | 25 | 24 | 31 | 44 |
| Comparative Sample 11 | 3 | 7 | 34 | 56 | 37 |
| Comparative Sample 12 | 22 | 22 | 27 | 29 | 49 |
| Comparative Sample 13 | 38 | 27 | 18 | 17 | 56 |

[Texture coefficient TC(0,0,12) of (0,0,12) plane of $\alpha$-$Al_2O_3$ layer]

For the obtained samples, X-ray diffraction measurement with a $2\theta/\theta$ focused optical system using Cu-K$\alpha$ rays was performed under the conditions of output: 45 kV, 200 mA, incident side solar slit: 5°, divergent vertical slit: 2/3°, divergent vertical limiting slit: 5 mm, scattering slit: 8 mm, light receiving side solar slit: 5°, light receiving slit: 10 mm, detector: D/tex ultra, scan mode: continuous, sampling width: 0.01°, scan speed: 12°/min, and $2\theta$ measurement range: 25° to 140°. The apparatus used was an X-ray diffractometer manufactured by Rigaku Corporation (model "SmartLab"). The peak intensity of each crystal plane of the $\alpha$-$Al_2O_3$ layer in the intermediate layer was determined from the X-ray diffraction pattern. The texture coefficient TC(0,0,12) of the (0,0,12) plane of the $\alpha$-$Al_2O_3$ layer is represented by the following expression (1) was determined based on the obtained peak intensity of each crystal plane. The results are shown in Table 9.

$$TC(0,0,12)=\frac{I(0,0,12)}{I_0(0,0,12)}\left\{\frac{1}{9}\sum\frac{I(h,k,l)}{I_0(h,k,l)}\right\}^{-1} \quad (1)$$

wherein I(h,k,l) is a peak intensity by X-ray diffraction obtained by measuring a (h,k,l) plane of the $\alpha$-$Al_2O_3$ layer, $I_0$(h,k,l) is a standard diffraction intensity of the (h,k,l) plane of $\alpha$-$Al_2O_3$ obtained from JCPDS card number 10-0173, and (h,k,l) refers to 9 crystal planes of (0,1,2), (1,0,4), (1,1,3), (0,2,4), (1,1,6), (2,1,4), (3,0,0), (0,2,10), and (0,0,12).

TABLE 9

| Sample Number | Coating layer Intermediate layer TC (0, 0, 12) |
|---|---|
| Invention Sample 1 | 7.2 |
| Invention Sample 2 | 7.4 |
| Invention Sample 3 | 7.3 |
| Invention Sample 4 | 7.1 |
| Invention Sample 5 | 7.0 |
| Invention Sample 6 | 7.4 |
| Invention Sample 7 | 7.3 |
| Invention Sample 8 | 7.2 |
| Invention Sample 9 | 7.1 |
| Invention Sample 10 | 7.1 |
| Invention Sample 11 | 7.2 |
| Invention Sample 12 | 6.1 |
| Invention Sample 13 | 6.7 |
| Invention Sample 14 | 8.1 |
| Invention Sample 15 | 7.2 |
| Invention Sample 16 | 7.7 |
| Invention Sample 17 | 7.5 |
| Invention Sample 18 | 7.2 |
| Invention Sample 19 | 7.1 |
| Invention Sample 20 | 7.2 |
| Invention Sample 21 | 7.0 |
| Invention Sample 22 | 5.9 |
| Invention Sample 23 | 6.3 |
| Invention Sample 24 | 8.6 |
| Invention Sample 25 | 8.9 |
| Comparative Sample 1 | 7.2 |
| Comparative Sample 2 | 7.2 |
| Comparative Sample 3 | 7.2 |
| Comparative Sample 4 | 7.2 |
| Comparative Sample 5 | 7.2 |
| Comparative Sample 6 | 8.8 |
| Comparative Sample 7 | 7.2 |
| Comparative Sample 8 | 7.2 |
| Comparative Sample 9 | 5.0 |
| Comparative Sample 10 | 7.2 |

TABLE 9-continued

| Sample Number | Coating layer Intermediate layer TC (0, 0, 12) |
|---|---|
| Comparative Sample 11 | 8.9 |
| Comparative Sample 12 | 7.2 |
| Comparative Sample 13 | 7.2 |

Cutting tests 1 and 2 were conducted using the obtained samples, i.e., invention samples 1 to 25 and comparative samples 1 to 13, under the following conditions. Cutting test 1 is a chipping test for evaluating chipping resistance, and cutting test 2 is a wear test for evaluating wear resistance. The results of the respective cutting tests are shown in Table 10.

[Cutting test 1]

Workpiece material: SCM415,

Workpiece material shape: round bar with two grooves at an equal distance on the outer peripheral surface, Cutting speed: 200 m/min, Depth of cut: 1.5 mm, Feed: 0.3 mm/rev, Coolant: water-soluble coolant, Evaluation item: After the start of cutting, cutting was stopped every 500 shocks, and a cutting edge ridgeline portion of the cutting tool was observed with a stereoscopic microscope (100-fold magnification). The same operation was repeated until chipping was observed at the cutting edge ridgeline portion. The cumulative number of shocks until chipping was generated was defined as the tool life.

[Cutting test 2]

Workpiece material: S45C,

Workpiece material shape: round bar,

Cutting speed: 250 m/min,

Depth of cut: 2.0 mm,

Feed: 0.3 mm/rev,

Coolant: water-soluble coolant,

Evaluation item: A machining time until the flank wear width of the cutting tool exceeded 0.3 mm was defined as the end of the tool life, and the machining time to reach the end of the tool life was measured.

As to the cumulative number of shocks to reach the end of the tool life in cutting test 1 (chipping test), evaluations were made with grade "A" for 12,000 shocks or more, grade "B" for 8,000 shocks or more and less than 12,000 shocks, and grade "C" for less than 8000 shocks. Further, as to the machining time to reach the end of the tool life in cutting test 2 (wear test), evaluations were made with grade "A" for 35 minutes or more, grade "B" for 25 minutes or more and less than 35 minutes, and "C" for less than 25 minutes. In such evaluations, "A" refers to excellent, "B" refers to good and "C" refers to inferior, meaning that a sample involving a larger number of "A"s or "B"s has more excellent cutting performance. The evaluation results are shown in Table 10.

TABLE 10

| Sample Number | Cutting test 1 Tool life (number of shocks) | Cutting test 1 Evaluation | Cutting test 2 Tool life (minutes) | Cutting test 2 Evaluation |
|---|---|---|---|---|
| Invention Sample 1 | 10000 | B | 32 | B |
| Invention Sample 2 | 8500 | B | 32 | B |
| Invention Sample 3 | 14000 | A | 30 | B |
| Invention Sample 4 | 15500 | A | 28 | B |

TABLE 10-continued

| | Cutting test 1 | | Cutting test 2 | |
| --- | --- | --- | --- | --- |
| Sample Number | Tool life (number of shocks) | Evaluation | Tool life (minutes) | Evaluation |
| Invention Sample 5 | 11000 | B | 26 | B |
| Invention Sample 6 | 10000 | B | 38 | A |
| Invention Sample 7 | 8000 | B | 42 | A |
| Invention Sample 8 | 10000 | B | 28 | B |
| Invention Sample 9 | 10500 | B | 29 | B |
| Invention Sample 10 | 9000 | B | 34 | B |
| Invention Sample 11 | 10000 | B | 37 | A |
| Invention Sample 12 | 11500 | B | 28 | B |
| Invention Sample 13 | 12000 | A | 29 | B |
| Invention Sample 14 | 10500 | B | 36 | A |
| Invention Sample 15 | 9000 | B | 35 | A |
| Invention Sample 16 | 10000 | B | 37 | A |
| Invention Sample 17 | 9500 | B | 31 | B |
| Invention Sample 18 | 9000 | B | 30 | B |
| Invention Sample 19 | 10000 | B | 31 | B |
| Invention Sample 20 | 10000 | B | 33 | B |
| Invention Sample 21 | 10500 | B | 30 | B |
| Invention Sample 22 | 8500 | B | 36 | A |
| Invention Sample 23 | 12500 | A | 26 | B |
| Invention Sample 24 | 13000 | A | 31 | B |
| Invention Sample 25 | 9000 | B | 38 | A |
| Comparative Sample 1 | 5000 | C | 30 | B |
| Comparative Sample 2 | 8000 | B | 24 | C |
| Comparative Sample 3 | 6500 | C | 26 | B |
| Comparative Sample 4 | 6000 | C | 28 | B |
| Comparative Sample 5 | 7500 | C | 25 | B |
| Comparative Sample 6 | 4000 | C | 31 | B |
| Comparative Sample 7 | 10000 | B | 22 | C |
| Comparative Sample 8 | 10500 | B | 22 | C |
| Comparative Sample 9 | 8500 | B | 23 | C |
| Comparative Sample 10 | 5000 | C | 29 | B |
| Comparative Sample 11 | 3500 | C | 33 | B |
| Comparative Sample 12 | 7500 | C | 24 | C |
| Comparative Sample 13 | 9000 | B | 24 | C |

The results in Table 10 show that each invention sample had grade "A" or "B" in both the chipping test and the wear test. Meanwhile, as to the evaluations made on the comparative samples, each comparative sample had grade "C" in either or both of the chipping test and the wear test. Accordingly, it is apparent that the chipping resistance and the wear resistance of each invention sample is more excellent than that of each comparative sample.

It is apparent from the above results that each invention sample has excellent chipping resistance and wear resistance, thereby resulting in a longer tool life.

Industrial Applicability

The coated cutting tool according to the present invention has excellent chipping resistance and wear resistance so that the tool life can be extended more than that involved in the prior art, and from such perspective, the coated cutting tool has industrial applicability.

REFERENCE SIGNS LIST

1: Substrate, 2: Lower layer, 3: Intermediate layer, 4: Upper layer, 5: Coating layer, 6: Coated cutting tool.

What is claimed is:

1. A coated cutting tool comprising a substrate and a coating layer formed on a surface of the substrate, wherein:

the coating layer comprises a lower layer, an intermediate layer, and an upper layer in this order from the substrate side to the surface side of the coating layer;

the lower layer comprises one or two or more Ti compound layers containing a Ti compound of Ti and an element of at least one kind selected from the group consisting of C, N, O and B;

the intermediate layer comprises an $\alpha$-$Al_2O_3$ layer containing $\alpha$-$Al_2O_3$;

the upper layer comprises one or two or more Ti compound layers containing a Ti compound of Ti and an element of at least one kind selected from the group consisting of C, N and O, and at least one of the Ti compound layers in the upper layer is a TiCN layer;

an average thickness of the upper layer is 1.00 μm or more and 6.50 μm or less; and the upper layer satisfies conditions represented by following formula (i) and formula (ii):

$$25 \leq RSA1 < 70 \quad \text{(i)}$$

in the formula (i), where, in a cross section of the upper layer in a direction perpendicular to the surface of the substrate, a sum of areas of a misorientation A formed by a normal to a (220) plane of each grain in the upper layer having the misorientation A in a range of 0 degrees or more and 45 degrees or less of the entire cross section is taken as 100 area %, RSA1 is a ratio, in terms of area %, of a cross-sectional area of a region where the misorientation A is 0 degrees or more and less than 10 degrees, the misorientation A being an angle, in terms of degrees, formed by the normal to the (220) plane of each grain having a cubic crystalline structure and a normal to the surface of the substrate; and $$25 \leq RSA2 < 70 \quad \text{(ii)}$$

in the formula (ii), where, in a cross section of the upper layer in a direction perpendicular to the surface of the substrate, the sum of areas of the misorientation A formed by the normal to the (220) plane of each grain in the upper layer having the misorientation A in the range of 0 degrees or more and 45 degrees or less of the entire cross section is taken as 100 area %, RSA2 is a ratio, in terms of area %, of a cross-sectional area of a region where the misorientation A is 20 degrees or more and less than 30 degrees, the misorientation A being an angle, in terms of degrees, formed by the normal to the (220) plane of each grain having the cubic crystalline structure and the normal to the surface of the substrate.

2. The coated cutting tool according to claim 1, wherein a sum of the RSA1 and RSA2 is 60 area % or more and 90 area % or less in the upper layer.

3. The coated cutting tool according to claim 1, wherein the upper layer is in contact with the intermediate layer; the upper layer comprises at least one layer selected from the group consisting of a layer containing TiCO, a layer containing TiON, and a layer containing TiCNO as an adhesion layer on a side in contact with the intermediate layer; and an average thickness of the adhesion layer is 0.05 μm or more and 1.50 μm or less.

4. The coated cutting tool according to claim 1, wherein a texture coefficient TC(0,0,12) of a (0,0,12) plane of the $\alpha$-$Al_2O_3$ layer represented by a following expression (1):

$$TC(0,0,12) = \frac{I(0,0,12)}{I_0(0,0,12)} \left\{ \frac{1}{9} \sum \frac{I(h,k,l)}{I_0(h,k,l)} \right\}^{-1} \quad (1)$$

wherein I(h,k,l) is a peak intensity by X-ray diffraction obtained by measuring a (h,k,l) plane of the $\alpha$-$Al_2O_3$ layer, $I_0$(h,k,l) is a standard diffraction intensity of a (h,k,l) plane of $\alpha$-$Al_2O_3$ obtained from JCPDS card number 10-0173, and (h,k,l) refers to 9 crystal planes of (0,1,2), (1,0,4), (1,1,3), (0,2,4), (1,1,6), (2,1,4), (3,0,0), (0,2,10), and (0,0,12), is 5.9 or more and 8.9 or less in the intermediate layer.

5. The coated cutting tool according to claim 1, wherein an average thickness of the intermediate layer is 3.00 μm or more and 15.00 μm or less.

6. The coated cutting tool according to claim 1, wherein an average thickness of the lower layer is 3.00 μm or more and 15.00 μm or less.

7. The coated cutting tool according to claim 1, wherein an average thickness of the entire coating layer is 10.00 μm or more and 30.00 μm or less.

8. The coated cutting tool according to claim 2, wherein the upper layer is in contact with the intermediate layer; the upper layer comprises at least one layer selected from the group consisting of a layer containing TiCO, a layer containing TiON, and a layer containing TiCNO as an adhesion layer on a side in contact with the intermediate layer; and an average thickness of the adhesion layer is 0.05 μm or more and 1.50 μm or less.

9. The coated cutting tool according to claim 2, wherein a texture coefficient TC(0,0,12) of a (0,0,12) plane of the $\alpha$-$Al_2O_3$ layer represented by a following expression (1):

$$TC(0,0,12) = \frac{I(0,0,12)}{I_0(0,0,12)}\left\{\frac{1}{9}\sum\frac{I(h,k,l)}{I_0(h,k,l)}\right\}^{-1} \quad (1)$$

wherein I(h,k,l) is a peak intensity by X-ray diffraction obtained by measuring a (h,k,l) plane of the $\alpha$-$Al_2O_3$ layer, $I_0$(h,k,l) is a standard diffraction intensity of a (h,k,l) plane of cx-$Al_2O_3$ obtained from JCPDS card number 10-0173, and (h,k,l) refers to 9 crystal planes of (0,1,2), (1,0,4), (1,1,3), (0,2,4), (1,1,6), (2,1,4), (3,0,0), (0,2,10), and (0,0, 12), is 5.9 or more and 8.9 or less in the intermediate layer.

10. The coated cutting tool according to claim 3, wherein a texture coefficient TC(0,0,12) of a (0,0,12) plane of the $\alpha$-$Al_2O_3$ layer represented by a following expression (1):

$$TC(0,0,12) = \frac{I(0,0,12)}{I_0(0,0,12)}\left\{\frac{1}{9}\sum\frac{I(h,k,l)}{I_0(h,k,l)}\right\}^{-1} \quad (1)$$

wherein I(h,k,l) is a peak intensity by X-ray diffraction obtained by measuring a (h,k,l) plane of the $\alpha$-$Al_2O_3$ layer, $I_0$(h,k,l) is a standard diffraction intensity of a (h,k,l) plane of $\alpha$-$Al_2O_3$ obtained from JCPDS card number 10-0173, and (h,k,l) refers to 9 crystal planes of (0,1,2), (1,0,4), (1,1,3), (0,2,4), (1,1,6), (2,1,4), (3,0,0), (0,2,10), and (0,0,12), is 5.9 or more and 8.9 or less in the intermediate layer.

11. The coated cutting tool according to claim 8, wherein a texture coefficient TC(0,0,12) of a (0,0,12) plane of the $\alpha$-$Al_2O_3$ layer represented by a following expression (1):

$$TC(0,0,12) = \frac{I(0,0,12)}{I_0(0,0,12)}\left\{\frac{1}{9}\sum\frac{I(h,k,l)}{I_0(h,k,l)}\right\}^{-1} \quad (1)$$

wherein I(h,k,l) is a peak intensity by X-ray diffraction obtained by measuring a (h,k,l) plane of the $\alpha$-$Al_2O_3$ layer, $I_0$(h,k,l) is a standard diffraction intensity of a (h,k,l) plane of $\alpha$-$Al_2O_3$ obtained from JCPDS card number 10-0173, and (h,k,l) refers to 9 crystal planes of (0,1,2), (1,0,4), (1,1,3), (0,2,4), (1,1,6), (2,1,4), (3,0,0), (0,2,10), and (0,0,12), is 5.9 or more and 8.9 or less in the intermediate layer.

12. The coated cutting tool according to claim 2, wherein an average thickness of the intermediate layer is 3.00 μm or more and 15.00 μm or less.

13. The coated cutting tool according to claim 3, wherein an average thickness of the intermediate layer is 3.00 μm or more and 15.00 μm or less.

14. The coated cutting tool according to claim 4, wherein an average thickness of the intermediate layer is 3.00 μm or more and 15.00 μm or less.

15. The coated cutting tool according to claim 8, wherein an average thickness of the intermediate layer is 3.00 μm or more and 15.00 μm or less.

16. The coated cutting tool according to claim 9, wherein an average thickness of the intermediate layer is 3.00 μm or more and 15.00 μm or less.

17. The coated cutting tool according to claim 10, wherein an average thickness of the intermediate layer is 3.00 μm or more and 15.00 μm or less.

18. The coated cutting tool according to claim 11, wherein an average thickness of the intermediate layer is 3.00 μm or more and 15.00 μm or less.

19. The coated cutting tool according to claim 2, wherein an average thickness of the lower layer is 3.00 μm or more and 15.00 μm or less.

20. The coated cutting tool according to claim 3, wherein an average thickness of the lower layer is 3.00 μm or more and 15.00 μm or less.

* * * * *